Patented Apr. 23, 1940

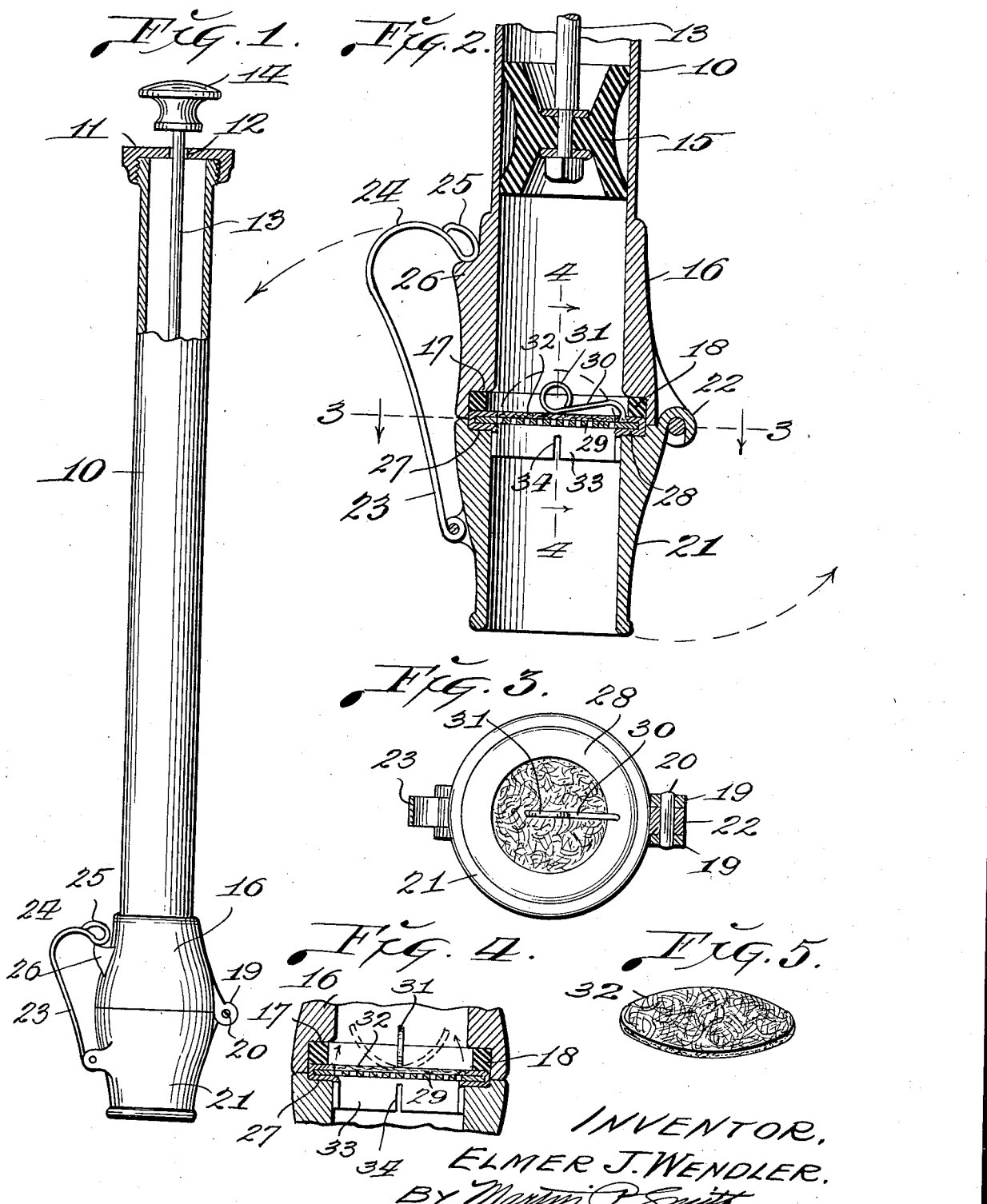

2,197,909

UNITED STATES PATENT OFFICE 2,197,909

MILK SEDIMENT TESTER

Elmer J. Wendler, Southgate, Calif.

Application December 23, 1938, Serial No. 247,466

2 Claims. (Cl. 73—51)

My invention relates to a device for testing milk to ascertain the amount of sediment contained therein and has for its principal object, the provision of a relatively simple, practical and inexpensive device that may be conveniently manipulated for ascertaining the amount of sediment contained in milk and, which device is particularly designed for use on milk as it is delivered by the milk producer to the dairy or establishment where the milk is acted upon and placed in containers for delivery to the markets and users.

The milk sediment testing device contemplated by my invention is of the type utilizing a wafer or thin disc of fibrous material upon which the sediment that is frequently found in milk, is deposited during the operation of the device and, one of the principal objects of my invention is to provide simple means for holding this porous wafer or disc in proper position in the device and to permit said disc or wafer to function as a butterfly valve when the device is operated to draw milk into the chamber above said disc or wafer.

Practically all states have laws and likewise practically all cities have ordinances that are especially directed to the increasing of the purity and food value of milk delivered to consumers and it is one of the objects of my invention, to provide a milk sediment testing device that will be highly effective and helpful in the treatment of milk to meet the laws and ordinances relating thereto.

With the foregoing and other objects in view, my invention consists in certain novel features of construction and arrangement of parts that will be hereinafter more fully described and claimed and illustrated in the accompanying drawing in which:

Fig. 1 is a side elevational view of a milk testing device constructed in accordance with my invention and with the upper portion thereof shown in vertical section.

Fig. 2 is an enlarged vertical section taken through the lower portion of the testing device and showing the porous wafer positioned therein.

Fig. 3 is a horizontal section taken on the line 3—3 of Fig. 2.

Fig. 4 is a vertical section taken on the line 4—4 of Fig. 2.

Fig. 5 is a perspective view of the porous wafer that is used in the testing device.

Referring by numerals to the accompanying drawing which illustrates a preferred embodiment of my invention, 10 designates a tube, preferably of metal, and the chamber within said tube having a capacity for a pre-determined amount of milk, for instance, a pint or a quart.

The upper end of this tube is externally threaded for the reception of a screw cap 11 and formed in the center of said cap is an aperture 12 for the accommodation of a piston rod 13 and, the latter provided on its upper end with a knob or handle 14.

The end of rod 13 within the tube 10 carries a piston 15, preferably of rubber, and which in operation draws milk into the tube and expels it therefrom.

Formed integral with or fixed to the lower end of tube 10 is a tubular head 16, the internal diameter of which is the same as the internal diameter of tube 10 and, formed in the lower end of the wall of this head is an annular groove 17 that receives a packing ring 18, preferably of rubber.

Formed on the lower end of head 16 and extending outwardly and downwardly therefrom are parallel ears 19 in which are seated the ends of a hinge pin 20.

Positioned directly below head 16 is a short tubular spout 21, the internal diameter of which is practically the same as the internal diameter of head 16 and tube 10 and, formed on the upper end of the wall of said spout 21 is an inverted U-shaped hook 22 that engages over hinge pin 20 between the ears 19.

Thus the spout 21 is hinged to the lower end of head 16 so that said spout may swing outwardly and thence upwardly to enable the filtering wafer or disc to be inserted in or removed from the device.

Further, this form of hinge enables spout 21 when swung outwardly and upwardly into a position parallel with head 16 to be removed from the latter, thus facilitating cleansing and sterilizing of the device and also facilitating assembly of the parts.

Hinged to the exterior of spout 21 at a point approximately midway between its upper and lower ends, is the lower end of an arm 23 of resilient metal, the upper end of which is formed into a hook 24. The end of this hook is bent to form a small loop 25 and the latter is adapted to engage on top of a lug 26 that is formed on the external surface of head 16, thus retaining the spout in closed position against the lower end of said head.

Formed in the upper edge of spout 21 is an annular groove 27 and, removably positioned therein is a ring 28 formed of thin sheet metal, channel-shape in cross section so as to receive the edge of a perforated disc 29.

When the spout 21 is closed against the lower end of head 16, the upper face of the ring 28 fits snugly against the under face of the packing ring 18, thus providing a practically fluid pressure tight joint between the parts.

Pivotally mounted on the upper flange of ring 28 adjacent the inner edge thereof, is the outer end of a finger 30, preferably formed of resilient wire, and which extends from its point of pivotal connection to said ring, upwardly, thence inwardly and downwardly to a point just above the center of the perforated disc 29, and the inner portion of this finger is bent to form an upstanding loop 31.

This resilient finger which may be swung from one side to the other is adapted to rest on the central portion of a porous disc or wafer 32 which overlies the perforated disc 29 and is encompassed by the upper flange of the ring 28. This disc or wafer 32, which is flexible to a certain degree, is formed from suitable fibrous material, for instance, cotton fibers, and the porosity is such that it will permit milk under pressure to pass through it and at the same time to filter therefrom and prevent the passage of sediment contained in said milk.

When properly positioned on the perforated disc 29, the wafer is retained in such position by the looped end of the resilient finger 30 as illustrated in Figs. 2 and 3.

Formed integral with the inner edge of the ring 28 that carries the perforated disc 29, is a depending flange 33 of resilient metal and, formed in said flange is a series of vertically disposed slots 34 open at their lower ends.

Thus, the material in the flange between the slots function as resilient walls that yieldingly engage the inner surface of the opening through spout 21, thus tending to retain the perforated disc carrying ring 28 in the annular recess 27 in the upper end of spout 21.

To insert the filtering disc in the device, hook 24 is disengaged from lug 26, thus permitting spout 21 to be swung downwardly and outwardly, thereby enabling the filtering disc to be positioned on the perforated disc 29 and the finger 30 is now swung around until the looped end thereof engages on the center of the disc. The spout 21 is now swung back into position beneath head 16 and retained in such position by the engagement of the loop 25 on the end of hook 24, against the upper end of lug 26.

The lower end of the device is now inserted in the body of milk to be tested and the piston rod 13 and piston 15 carried by the lower end thereof are drawn upwardly through tube 10 and, by suction milk will be drawn upwardly through spout 21, thence through the perforations of disc 29, and the pressure of the milk against the disc 32 will cause opposite side portions thereof to swing upwardly as illustrated by dotted lines in Fig. 4, thus permitting the ready passage of milk into the tube 10 below the upwardly moving piston.

During this operation the porous disc is retained in position by the resilient finger 30.

To complete the test, the piston and piston rod are moved downwardly, thereby exerting pressure on the milk in the device above the porous disc 32 and this pressure causes the said disc to return to its flat position upon the perforated disc 29 and, as the pressure on the milk continues said milk will be forced through the porous disc and the perforated disc, with the result that sediment contained in the milk will lodge on the upper surface of the porous disc.

Spout 21 is now released and swung downwardly and outwardly from the lower end of head 16 to permit the removal of the porous disc or wafer and the latter carrying the sediment extracted from the milk, is used by conventional testing methods for determining the amount of sediment contained in a predetermined quantity of milk.

Thus it will be seen that I have provided a milk sediment testing device that is relatively simple in construction, inexpensive of manufacture, and very effective in performing the functions for which it is intended.

It will be understood that minor changes in the size, form and construction of the various parts of my improved milk sediment tester, may be made and substituted for those herein shown and described, without departing from the spirit of my invention, the scope of which is set forth in the appended claims.

I claim as my invention:

1. In a milk sediment testing device, a tube, a piston and piston rod arranged for operation in said tube for drawing milk into said tube and expelling said milk therefrom, a tubular spout hinged to the lower end of said tube, means for retaining said tubular spout in closed position upon the end of the tube, a ring removably seated in the upper end of said spout, which ring is channel-shape in cross-section, a perforated disc carried by said ring, with its marginal edge positioned between the flanges of said channel-shaped ring, a porous wafer removably positioned on top of said perforated disc within the upper one of the flanges of said ring and a resilient finger pivotally connected at one end to the upper one of the flanges of the ring that holds said perforated disc for retaining said porous wafer in position on said perforated disc.

2. A milk sediment testing device as set forth in claim 1, with a flange of resilient material depending from the inner edge of the lower one of the flanges of said ring and which depending flange is slotted and adapted to enter the upper end of said spout for retaining the ring therein when the spout is open.

ELMER J. WENDLER.